(12) United States Patent
Kinno

(10) Patent No.: US 6,283,673 B1
(45) Date of Patent: Sep. 4, 2001

(54) METHOD OF PROTECTING COASTAL LAND FROM RISE OF SURFACE OF THE SEA

(75) Inventor: Hitoshi Kinno, Tokushima (JP)

(73) Assignee: The Earth Science Laboratory Corp., Tokushima (JP)

( * ) Notice: Subject to any disclaimer, the term of this patent is extended or adjusted under 35 U.S.C. 154(b) by 0 days.

(21) Appl. No.: 09/403,729

(22) PCT Filed: Jun. 29, 1998

(86) PCT No.: PCT/JP98/02951

§ 371 Date: Oct. 26, 1999

§ 102(e) Date: Oct. 26, 1999

(87) PCT Pub. No.: WO99/02783

PCT Pub. Date: Jan. 21, 1999

(30) Foreign Application Priority Data

Jul. 10, 1997 (JP) .................................................. 9-200818
Jun. 11, 1998 (JP) ................................................ 10-163217

(51) Int. Cl.$^7$ ................................. E02B 3/10; E02B 9/08
(52) U.S. Cl. ................................. 405/87; 405/78; 405/15
(58) Field of Search ................................. 405/15, 52, 53, 405/37, 39, 55, 84, 85, 86, 75, 76, 77, 78, 107, 87; 52/169.7

(56) References Cited

U.S. PATENT DOCUMENTS

| 3,826,098 | * | 7/1974 | Larsen | 405/226 |
| 4,399,039 | * | 8/1983 | Yong | 210/728 |
| 5,160,214 | * | 11/1992 | Sakurai et al. | 405/36 |
| 5,524,399 | * | 6/1996 | Reum et al. | 52/169.7 |
| 5,555,877 | * | 9/1996 | Lockwood et al. | 126/565 |
| 6,000,880 | * | 12/1999 | Halus | 405/52 |

FOREIGN PATENT DOCUMENTS

| 50-102816 | 8/1975 | (JP) . |
| 5-263413 | 10/1993 | (JP) . |
| 8-134882 | 5/1996 | (JP) . |

\* cited by examiner

*Primary Examiner*—David Bagnell
*Assistant Examiner*—Frederick L. Lagman
(74) *Attorney, Agent, or Firm*—Armstrong, Westerman, Hattori, McLeland & Naughton

(57) ABSTRACT

A system for protecting a coastal land from a rise of the surface of the sea, wherein offshore dams and caissons containing pump-turbines are provided in such a manner that the caissons and dams extend in parallel with the coastline of the land. Partition dams are provided so as to connect the offshore dams and the coastline together to make ponds. The water level of each pond is kept lower than a preset level, which is several meters lower than an average level of the surface of the ocean, by an operation of the pump-turbines and avoiding not only the submergence of the coastal land due to the rise in the sea level caused by global warming, but also expanding the area of offshore land. A high-efficiency pumped storage power generation is conducted in which the development of tidal energy and seawater pumped storage power generation are combined with each other by carrying out tidal wave pumped storage power generation, in which the head of a water turbine is lager than the head of the pump, and which comprises lowering the water level of the pond to a level lower than the preset level by an operation of the pump at low tide during nighttime, and introducing seawater from the ocean into ponds by an operation of the water turbine at high tide during daytime to increase the water level of each pond up to the set level, whereby economical efficiency is given to the system equipment.

2 Claims, 3 Drawing Sheets

A-A CROSS-SECTIONAL VIEW

B-B CROSS-SECTIONAL VIEW

METHOD OF PROTECTING COASTAL LAND FROM RISE OF SURFACE OF THE SEA

FIELD OF THE INVENTION

This invention relates to a technique for protecting a coastal land from a rise in the sea level due to global warming by building a dam having pump-turbines along the coastline. More specifically, the invention relates to a technique for building a tidal water power plant by constructing a pond that separates the coastline from the offshore sea along the coastline, and by keeping the water level of the pond lower than the water level of the offshore sea. The inner pond functions as a lower pond and the offshore sea functions as an upper pond, whereby the environment is protected, and at the same time, tidal energy is developed.

BACKGROUND OF THE INVENTION

As discussed at the International Symposium for Protecting Global Warming Phenomena held in Kyoto on December 1997, the problem of rising sea level is expected in the next century. Known techniques for protecting a coastal land from a rise in the sea level had been to increase the bulk and height of a levee or barrier. The inventor of the present invention has found that the technique for building a tidal power generation system operated during high tide in a bay, which was disclosed in Japanese Patent Application No. H9-200818 by the same inventor as the present invention, can be applied to protect the coast line from a rise of the surface of the sea, and that the tidal water generation system can be constructed at any coastline on the earth.

In H9-200818, in order to convert the tidal range in a bay into energy, a tidal channel is built on one side of or in the center of the bay, so that the channel extends from the bay entrance to the depth of the bay. The tidal range is kept in the natural state. Then, a multiplicity of rectangular ponds, with the coastline as one side of each rectangle, are constructed on one side or both sides of the channel. Each pond is surrounded by a dam, which includes one or more pump-turbines therein. To generate electric power during a high tide, the water level of each pond must always be kept lower than the average sea level. To be more precise, during nighttime and low tide, the pumps are driven to lower the water level of each pond, using excess electric power supplied from the power network. Then, during daytime and high tide, the seawater is introduced in each pond by the turbines until the water level of the pond reaches the preset level. This system can achieve at least 100% efficiency of pumped storage power generation. In order to construct this system economically, a single pond is first constructed as a unit. Then, after the construction of the first pond is completed, the next pond is constructed adjacent to the first pond, while the first pond is used to generate electric power. In this manner, all ponds can be successively constructed in due course.

SUMMARY OF THE INVENTION

If the sea level rises by 50 cm to 100 cm in the 21st century, it is inevitable that the coastline will recede. Such situation will cause decrease of the shore, elimination of the beach, and submergence of zero-meter areas. These problems will be especially serious in The Netherlands, Bangladesh, and islands with altitude of 1 meter. The present invention is an improvement of the above-mentioned invention of H9-200818, and is intended to allow the previous invention to be applied not only to the tidal power generation sites in a limited area, but also to any shore on the earth.

A coastal land, which is to be protected from a rise in the sea level, is separated from the offshore sea by constructing an offshore dam that extends in parallel with the coastline of the land. Partition dams extend from the both ends of the coastline to the offshore dam so as to be substantially perpendicular to the offshore dam. The partition dams and the offshore dam define a pond. The maximum water level of the pond is kept to a preset level which is lower than the average sea level of the offshore sea by several meters (e.g., 3 meters). This arrangement allows the coastline to advance toward the sea, instead of receding of the coastline. Caissons which contains pump-turbines are coupled with the offshore dam in order to achieve substantially 100% efficiency of tidal power generation, making use of the water-level difference between the offshore sea and the pond. This system also allows a composite energy of the tidal energy and the pumped storage power generation to be developed. Thus, the present invention aims to produce a new and clean energy, while reducing the driving energy, as well as to protect the coastal land from the rising the sea level and increase the area of the shore. The invention also aims to contribute to the prevention of global warming phenomena. A significant feature of the present invention over the previous one disclosed in H9-200818 is that the water level of each pond is controlled so as to be lower than the average sea level by 3 to 4 meters. This feature essentially allows propeller turbines to be used in any shore on the earth because the typical tidal range is about 2 meters at most shores, which is insufficient to allow the propeller turbines to output power.

PREFERRED EMBODIMENT OF THE INVENTION

The preferred embodiment of the invention will now be described with reference to the attached drawings.

Figure 1:
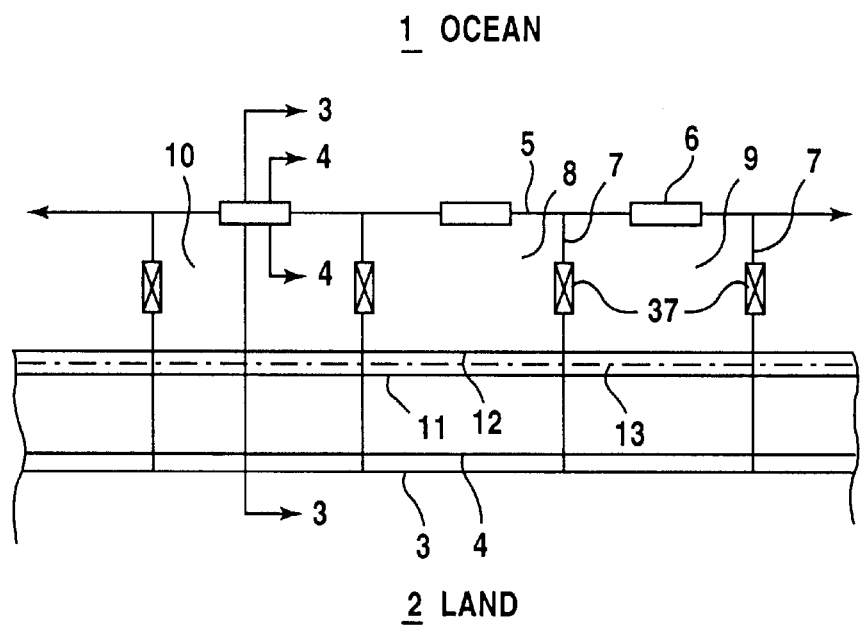
FIG. 1 is a plan view of a system for protecting a coastal land from a rise in the sea level, which includes tidal power-generation ponds and dams for separating a straight shore from the offshore sea, changes of the surface level of which is expected to rise.
Figure 3:
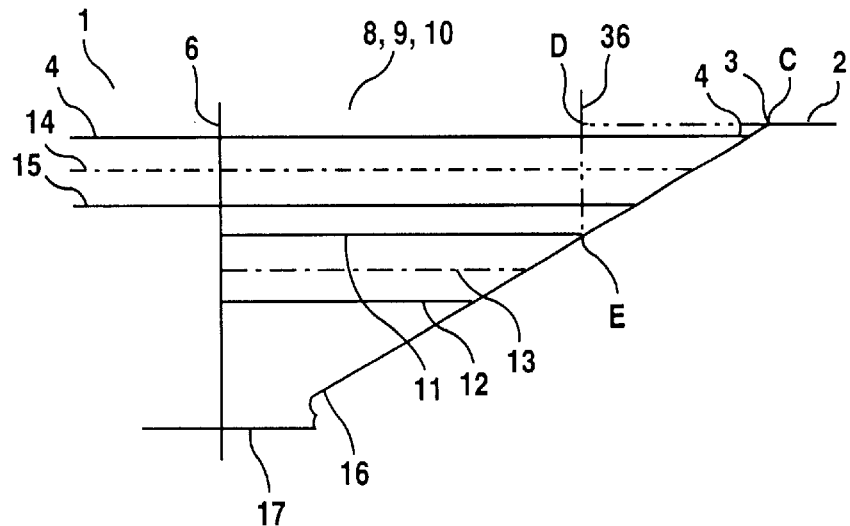
FIG. 3 is a cross-sectional view taken along the 3—3 line of FIG. 1, which shows changes in the water levels of the offshore sea 1 and the pond 8, the slope of the sea floor, and the position of the offshore dam.

In FIGS. 1 and 3, a coastal land 2 having a straight coastline 3 faces the sea 1. The seafloor slopes from the coastline 3, as shown by the slope 3-16. The sea level 4 is the average level during high tide. An offshore dam 5 extends in the sea in parallel to the coastline 3. Partition dams 7 extend from both ends of the offshore dam 5 to the coastal land 2. One or two caissons 6 (FIG. 4) having pump-turbines 20, are connected to the offshore dam 5. The offshore dam 5 and the partition dams 7 define a pond 8 between the offshore sea 1 and the coastal land 2. The pond 8 is constructed as a unit cell of the system for protecting the coastal land 2 from a rise in the sea level. Accordingly, additional ponds 9 and 10 may be constructed in the direction shown by the arrow in FIG. 1, as needed. A floodgate 37 is provided to each partition dam 7 for purposes of controlling water stream between two adjacent ponds, and of allowing work boats to pass through.

Figure 4:
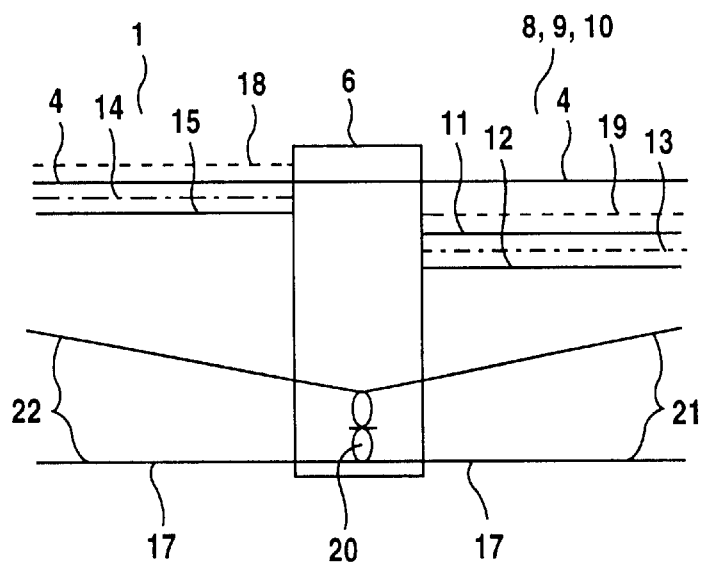
FIG. 4 is a cross-sectional view taken along the 4—4 line of FIG. 1, which shows the relationship between the water levels of the offshore sea 1 and the pond 8, and a caisson having a pump-turbine 20 therein.

As shown in FIGS. 3 and 4, the maximum water level 11 of the pond 8 is reduced in advance to a preset level by driving pumps, whereby the coastline 3 fronting the pond 8 advances from point C to point E shown in FIG. 3. Consequently, the land area increases. It is desirable to fill the sloped edge of the pond up to the two-dot line C-D, so that the vertical position of the coastline 3 rises to point D, in case the dam collapses. The newly created land C-D-E can be used for multiple purposes. A pump-turbine 20 is positioned near the seafloor inside the caisson 6, as shown in FIG. 4. Draft tubes 21 and 22 extend from both sides of the pump-turbine 20 toward the land 2 and the offshore sea 1.

Even if the surface of the offshore sea 1 rises by 1 meter and reaches the dashed line 18 in the future, the dam operation can be kept sufficiently safe by elevating the water level 11 of the pond 8 by 1-meter to the dashed line 19. In this fashion, both heads of the pump-turbine can be kept unchanged. The one-dot line 13 indicates the average water level of the pond 8. The one-dot line 13 becomes one side of the effective average area of the pond 8. It is preferred as a safety measure to build a barrier 36 along the coastline of the reclaimed land at point D shown in FIG. 3.

Figure 2:
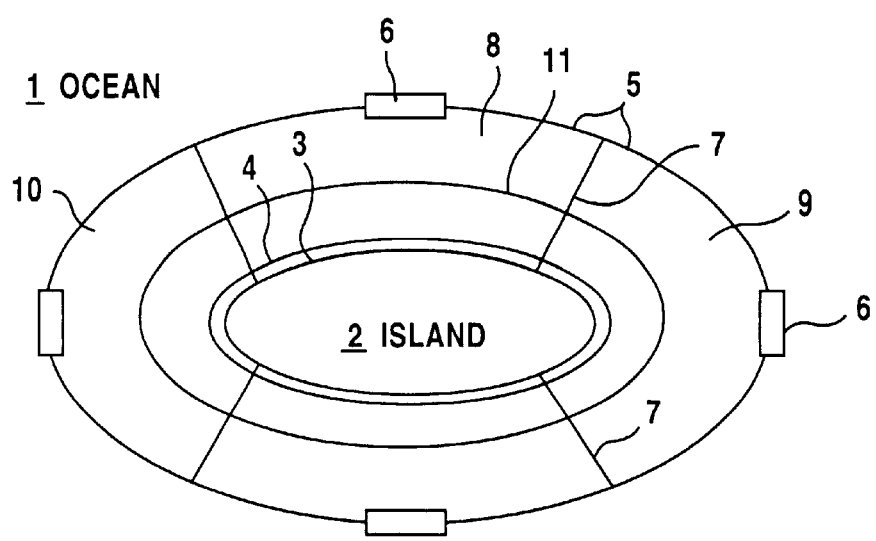
FIG. 2 is a plan view of a system for protecting an island from a rise in the sea level.

FIG. 2 illustrates an embodiment, in which the system of the invention is applied to an island 2. In this case, the coastline 3 shown in FIG. 1 is a curve. The same elements, including the offshore dam 5, the caisson 6, and the partition dams 7, are denoted in FIGS. 1, 3 and 4 by the same numerical references. The number of ponds 8, 9, and 10 depends on the size of the island 2 and the length of the coastline 3.

Figure 5:
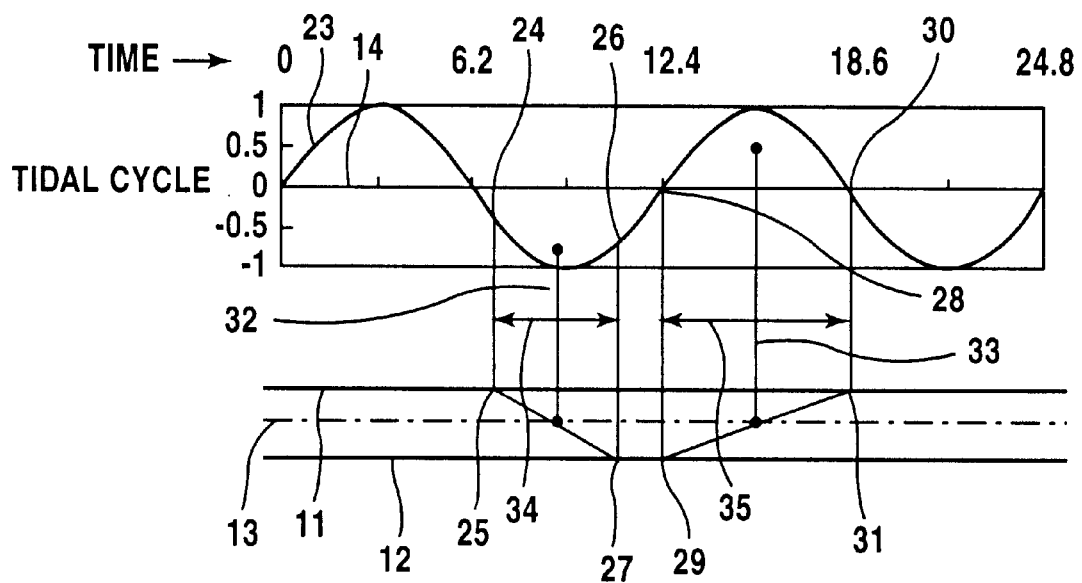
FIG. 5 is a time chart showing a tidal cycle 23, each head of the pump and turbine 20, machine drive timings, and the maximum and minimum water-levels 11 and 12 of the pond 8.

FIG. 5 is a timing chart showing the relations among the tidal level, the pump head, the turbine head, the amount of flow, and the machine power and energy when the pump and turbine are operated. The upper half of FIG. 5 shows the tidal level 23 of two cycles, with the horizontal axis as a time axis. One cycle of the tide is 12.4 hours. The ebb and flood occur twice a day, where an ebb occurs without fail during the night (12 hours), and flood occurs without fail during the day (12 hours). The lower half of FIG. 5 shows the maximum water level 11 and the minimum water level 12 of the pond 8. If the maximum powers of the pump and the turbine are Lp(kilowatt) and Lt(kilowatt), Lp equals Lt because of the structure of the pump-turbine. Let assume that the pump-turbine uses a Kaplan-type vaned wheel, and both the pump and the turbine are driven at their maximum outputs regardless of their heads.

The pump head at the beginning of the pumping operation is indicated by the vertical line 24–25, which is a difference between the water level 25 of the pond 8 and the tidal level 24. The pump head at the end of the pumping operation is indicated by the vertical line 26–27. During the pumping operation, the tidal level changes from 24 to 26, and the water level of the pond 8 varies from 25 to 27. The period of the pumping operation is indicted by the horizontal line 34. The average pump head during this period is indicated by the vertical line 32. The turbine head at the beginning of the driving operation is indicated by the vertical line 28–29, and the turbine head at the end of the driving operation is indicated by the vertical line 30–31. The average turbine head during the driving operation is indicated by the vertical line 33, and the driving period of the turbine is indicated by the horizontal line 35.

If the average flow rate of the pumping operation and the average flow rate of the turbine operation are Qp (m³/s) and Qt (m³/s), and if the average pump head 32 and the average turbine head 33 are Hp (meters) and Ht (meters), with the average efficiencies Fp and Ft of the pump and the turbine, then both machines power (kilowatt) are expressed by equations (1) and (2).

$$Lp = K*Hp*Qp/Fp \qquad (1)$$

$$Lt = K*Ht*Qt*Ft \qquad (2)$$

where K is a proportionality constant. Because Lp equals Lt, $$Qp/Qt = (Ht/Hp)*Fm \qquad (3)$$

where Fm=Fp*Ft.

If Ht/Hp=1.5, and Fm=0.7, then, $$Qp = 1.05*Qt \qquad (4)$$

Since the driving times of the pump and the turbine for discharge of the same amount of water are inversely proportional to each average flow rate, if the driving time of the pump is Tp and the driving time of the turbine is Tt, $$Tt = 1.05*Tp \qquad (5)$$

Because the input energy Ep(kWh) required for the pump is the product of Lp and Tp, (Ep=Lp*Tp), and the output energy Et(kWh) of the turbine is the product of Lt and Tt, Et=Lt*Tt, and because Lp equals Lt, $$Et/Ep = 1.05 \qquad (6)$$

The efficiency of the pumped storage power generation is 105% in this case. The efficiency of the pumped storage power generation is 70% if the tidal range is almost zero, as in the Sea of Japan. However, as the tidal range increases, the efficiency of the power generation rises up. With the average maximum tidal range of 1.7 m, the efficiency becomes 100%. With a still larger tidal range, the efficiency further increases.

INDUSTRIAL UTILIZATION

As has been described, the present invention not only protects the coastal land from a rise in the sea level, which is expected to occur in the 21$^{st}$ century due to the global warming phenomena, but would also allow the coastal area to be expanded into the sea. At the same time, clean tidal energy is economically generated with 100% efficiency of the pumped storage power generation. Besides these advantages, the present invention also has the following applications and advantages:

1. A part or all of a pond (or several ponds) may be filled up with earth as needed. The reclaimed land may be developed and used as a new town, a marine airport, harbor facilities, a fishing port, an industrial site, leisure facilities, an agricultural site, etc. In this case, additional ponds may be constructed in the sea to build an additional pumped storage power plant.

2. The ponds 8, 9 and 10 are suitable for fish-raising because the sea water is introduced in and discharged from the ponds by the pump-turbine once a day, and accordingly, contamination of the trapped water can be prevented.

3. The offshore dam 5 can effectively protect the coastal land 2 from seismic waves and typhoon floods.

4. Because the water level of the pond is kept low all the time, the drainage of the coastal land becomes good, which can effectively prevent agricultural areas from salt damage.

5. The top faces of the offshore dam and the partition dams can be used as a motor way or a railway. The inside of the offshore dam and the partition dams can also be used as a tunnel. Since power sources of the pumped storage power plant are located along the dams, a new electric transportation system, such as a linear motor car or an unmanned train, can be developed.

What is claimed is:

1. A method for constructing a series of ponds to protect coastal land from a rise of the surface of the sea, comprising the steps of:

constructing a first offshore dam substantially parallel to the coastline, said first offshore dam containing at least one caisson having at least one pump turbine;

constructing two first partition dams substantially perpendicular to the offshore dam, said two first partition dams containing flood gates;

connecting the first offshore dam to the two first partition dams to form a first pond, between the first offshore dam, the coastline and the two first partition dams;

extending the offshore dam, with the extension containing at least one caisson having at least one pump turbine, for construction of a second pond;

constructing a further partition dam, containing flood gates, substantially perpendicular to the extension of the offshore dam; and connecting the further partition dam to the extension of the offshore dam and the coastline to form a second pond, adjacent to said first pond between the extension of the offshore dam, the coastline, a first partition dam, and the further partition dam.

2. The method of claim 1, wherein a still further offshore dam extension is extended from the second pond, said further offshore dam extension having at least one caisson having a pump turbine;

constructing a still further partition dam, containing flood gates, substantially perpendicular to the still further extension of the offshore dam; and connecting the further partition dam to the further extension of the offshore dam and the coastline to form at least one additional pond, adjacent to the second pond, between the still further extension of the offshore dam, the coastline, the further partition dam, and the still further partition dam.

* * * * *

UNITED STATES PATENT AND TRADEMARK OFFICE
CERTIFICATE OF CORRECTION

PATENT NO. : 6,283,673 B1  Page 1 of 1
DATED : September 4, 2001
INVENTOR(S) : Kinno It is certified that error appears in the above-identified patent and that said Letters Patent is hereby corrected as shown below:

Drawings,
FIG. 3, "A-A Cross-Sectional View" should read -- 3-3 Cross-Sectional View --.

FIG. 4, "B-B Cross-Sectional View" should read -- 4-4 Cross-Sectional View --.

Signed and Sealed this

Fifth Day of March, 2002

*Attest:*

*Attesting Officer*

JAMES E. ROGAN
*Director of the United States Patent and Trademark Office*